United States Patent [19]

Miley et al.

[11] 4,091,336

[45] May 23, 1978

[54] DIRECT NUCLEAR PUMPED LASER

[75] Inventors: George H. Miley, Champagne; William E. Wells, Urbana, both of Ill.; Russell J. DeYoung, Hampton, Va.

[73] Assignee: The United States of America as represented by the United States Department of Energy, Washington, D.C.

[21] Appl. No.: 690,499

[22] Filed: May 27, 1976

[51] Int. Cl.² .............................................. H01S 3/09
[52] U.S. Cl. .......................... 331/94.5 P; 331/94.5 G
[58] Field of Search ........................ 331/94.5; 330/4.3

[56] References Cited

U.S. PATENT DOCUMENTS

| 3,391,281 | 7/1968 | Eerkens | 331/94.5 P |
| 3,952,263 | 4/1976 | McArthur et al. | 331/94.5 P |

Primary Examiner—William L. Sikes
Attorney, Agent, or Firm—Dean E. Carlson; Frank H. Jackson; Paul A. Gottlieb

[57] ABSTRACT

There is provided a direct nuclear pumped gas laser in which the lasing mechanism is collisional radiated recombination of ions. The gas laser active medium is a mixture of the gases, with one example being neon and nitrogen.

5 Claims, 1 Drawing Figure

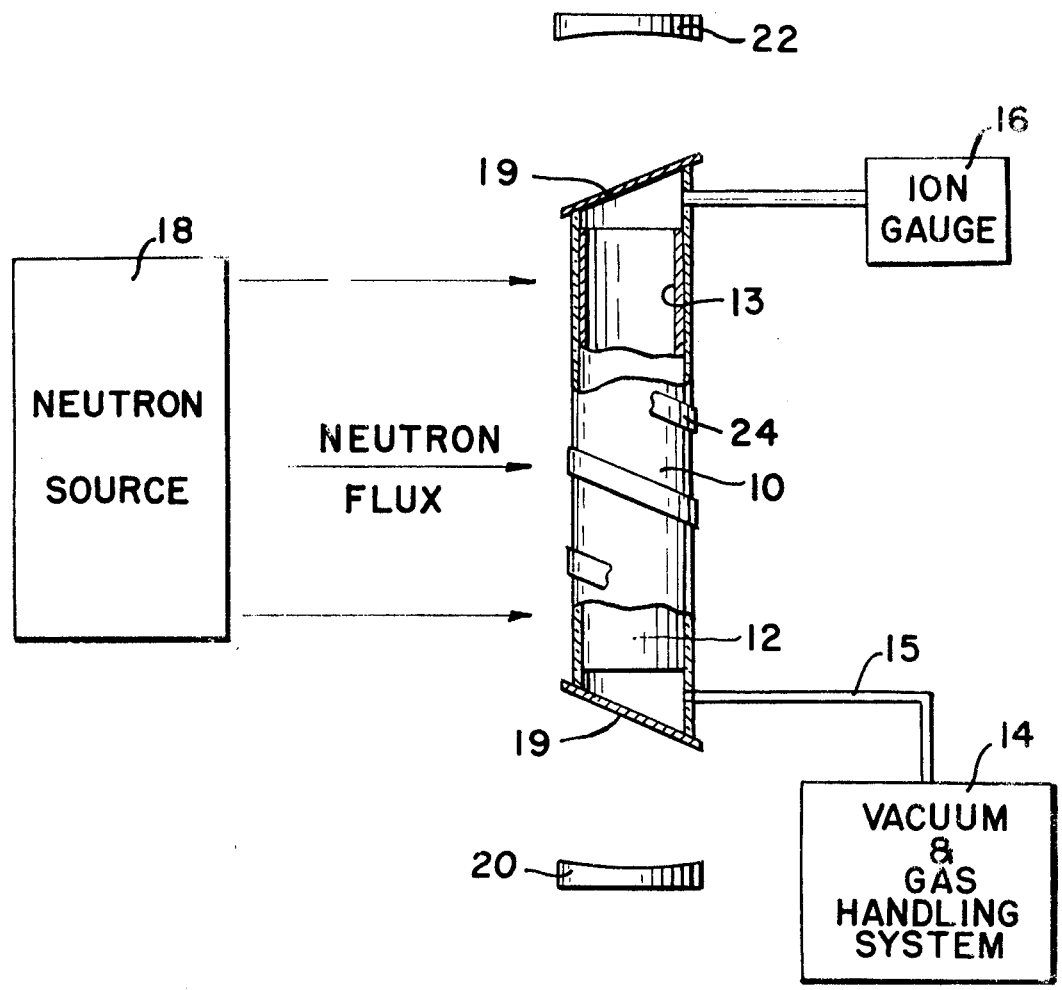

DIRECT NUCLEAR PUMPED LASER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Nuclear reaction product pumping as a means to excite a population inversion in a lasing medium is a known technique. Lasers using such technique are commonly referred to as direct nuclear pumped (DNP) lasers, and they use the products of nuclear reactions to directly ionize and excite the laser medium. These are very promising for high-power applications, since neutrons can penetrate a high-pressure gas and still excite nuclear reactions (i.e. pump) quite uniformly throughout the gas volume. Due to the large neutron flux from a nuclear reactor, potentially compact high-power DNP lasers may be constructed. This would be important for space applications where systems with high energy density and low weight are essential. Potential ground applications for such a high-powered laser include laser pellet fusion and isotope separation. Examples of DNP lasers are the CO laser developed at Sandia National Laboratory and the He-Xe laser developed at Los Alamos National Laboratory. This disclosure relates to the discovery of a third DNP laser, the Ne-$N_2$ laser. The Ne-$N_2$ laser herein described is the first DNP laser to exhibit collision radiated recombination of ions. Such a lasing mechanism allows the laser to operate with a lower threshold and lower wavelength than other DNP lasers and with higher efficiency than the same electrical laser.

It is therefore an object of this invention to provide a direct nuclear pumped laser.

Another object of this invention is to provide a DNP laser wherein the laser active medium is a mixture of neon-nitrogen gases.

SUMMARY OF THE INVENTION

A laser is provided including a laser cavity filled with a gaseous laser active material. This material is exposed to ionizing radiation developed by the nuclear reaction between neutrons from a neutron source and fissionable material. The laser active material is a mixture of gases which in the preferred embodiment is a mixture of neon and nitrogen. When subjected to the ionizing radiation, the particular laser active medium is effectively excited producing a lasing reaction.

DESCRIPTION OF THE DRAWING

The FIGURE shows a DNP laser.

DETAILED DESCRIPTION

Referring to the figure, there is shown a direct nuclear pumped laser. Within laser cell 10 is positioned cylinder 12 which is coated on the inner wall 13 with the source of ionizing radiation, a fissionable material. Cell 10 is, for example, of quartz, while cylinders 12 are of aluminum, coated either with boron-10 or uranium-235 or other fissionable material. The length of the aluminum cylinders 12 is generally determined by the dimensions of the source of radiation to which the coating is subjected. Cell 10, and in particular the aluminum cylinder 12, is connected to a gas-handling vacuum system 14 such as via a stainless steel vacuum line 15. The gas-handling system 14 is used to introduce gas into cylinder 12 and also to maintain the proper pressure of the gas and to evacuate the gas when desired. Monitoring of the gas pressure in the cell may be done by an ion gage 16 mounted internally to the laser cell 10. The laser cell 10 is placed adjacent to a source of neutron flux 18 such as a nuclear reactor. The laser cell 10 is provided with windows 19, cut at either end at Brewster's angle and is placed between mirrors 20 and 22. Mirror 22 is the output mirror and, as such, has a reflectivity less than mirror 20. The reflectivities of the mirrors should be on the order of 95% or better to prevent losses while the power is building up in the laser active medium. For example, mirror 20 might have a reflectivity of 99.8% while mirror 22 might have a reflectivity of 99.5%.

The device may be operated as a quasi steady-state laser or as a pulsed laser. In quasi steady-state with a sufficient neutron flux provided, the lasing action may be made continuous. With pulsed operation, gas is introduced into tube 12 by gas-handling system 14 and, after the lasing pulse is outgassed by gas-handling system 14. The particular gas to be introduced into cylinder 12 is a mixture of two gases, a majority and a minority gas. The majority gas should have the proper energy levels and metastable states to transfer energy to the minority gas, while the minority gas should be a simple molecular gas which when dissociated can form atomic ions and can recombine by electron ion recombination into the upper laser level. An example of such a mixture is a majority gas of neon and a minority gas of nitrogen. The lasing obtained from this gas mixture demonstrated the lowest neutron flux density necessary to obtain threshold of any direct nuclear pump laser to date.

Let us consider the laser shown in the figure with an Ne-$N_2$ gas mixture as the laser active material. It has been observed that with a boron-10 coating special precautions must be used in introducing the nitrogen into the gas mixture. It appears that boron coated cylinders 12 will absorb nitrogen during the first neutron pulse from source 18. It has been found that, by heating the cylinder 12, such as by means of an electric resistance heater 24, such as a heater tape wrapped around tube 10, this absorbed nitrogen can be outgassed from the boron coating in the desired concentration and lasing will occur. From this point each neutron pulse will produce lasing. Therefore, with boron as a coating it may not be ncessary to separately introduce nitrogen by the gas-handling system 14. With the uranium coating this wall absorption effect was not observed. The nitrogen is introduced with the neon and lasing occurs with the first pulse.

The limitations which will produce the lasing effect have been determined to be the concentration of nitrogen with respect to neon, the total pressure of the neon-nitrogen mixture, and the neutron flux density. These limitations apply to all possible majority-minority gas combinations and in similar magnitudes. With these criteria meeting the conditions which will be specified, lasing occurs by the interaction of the nuclear reaction products with the gas mixture within cylinder 12. A neutron flux is directed towards the coating on cylinder 12. The neutrons and the coating react and, if the coating is boron-10, then alpha particles are produced which are directed into the gas mixture and, if uranium-235 is the coating, then ions are produced which are directed into the gas mixture.

There are a variety of processes within the gas mixture which produce the lasing effect; however, there is strong evidence that the most significant process is collisional radiated recombination of atomic nitrogen ions. Since, as will be described, there is considerably more neon than nitrogen, the ionizing particles interreact with the gas in such a manner that most energy from these particles is transferred to the neon rather than the nitrogen. This creates the long-lived metastable state in neon which will then collide with the nitrogen. Through a number of possible collisional processes, atomic nitrogen ions are formed and then by collisional radiated recombination the atomic nitrogen ion is excited from the ground state to an upper laser level. The nitrogen in this upper laser level then lases to the lower laser level. This lasing of nitrogen has been observed to occur at two wavelengths. These wavelengths are at about 8629 A and 9393 A.

The mixture of nitrogen to neon gives lasing with nitrogen having a concentration of between approximately 0.01% to $\frac{1}{2}$% of nitrogen in neon. Of course, too small a concentration means that not enough excited states can be created in the mixture to create lasing. The total pressure of the nitrogen-neon mixture is also a limiting factor. The ideal pressure is one which allows maximum energy distribution at the center line of cylinder 12. Too high a pressure will inhibit the ionizing particles from reaching the center, so that only at the area adjacent the coating of cylinder 12 will there be excited states and therefore threshold will not be reached. With too low a pressure, the ionizing particles will shoot right across the laser gas and, in effect, will see no gas. Thus no excited states will be created. With a boron coating and a tube diameter of approximately 1 inch, pressures between 75 Torr and 400 Torr gave lasing. Of course, with a uranium coating, this pressure would be different, since the ionizing radiation would be a different particle. The neutron flux is another condition for establishing lasing in the neon-nitrogen mixture. The neutron flux density determines the level of ionizing radiation generated by the interaction of the neutron density with the coating 13 on cylinder 12. It is dependent upon the geometry of the laser and the particular coating. For the circular laser herein described, the minimum neutron flux density which obtained lasing, i.e. sufficient ionizing radiation to raise the appropriate gas mixture to threshold, was observed to be $1 \times 10^{15}$ neutrons per cm$^2$ per second. These criteria and the respective values given are applicable to other possible gas mixtures, such as He-CO.

The resulting laser which satisfies the conditions specified above showed the lowest neutron flux density necessary to reach threshold for a direct nuclear pump laser and demonstrated the shortest wavelength (most energetic photons) for any direct nuclear pump laser. Further, the Ne-N$_2$ laser is believed the first DNP laser showing collisional radiated recombination to produce the lasing action. Such a lasing process is a more efficient process than comparable electrical gas discharge plasma laser processes. The nuclear radiation induced plasma herein described produces a nonmaxwellian electron energy distribution function, characterized by a high energy tail, which is more efficient than a gas electric discharge plasma in producing ionization and also contains a bulk of low energy electrons which are efficient in recombination. The result of this is that the radiation induced plasma achieves threshold while the average electron temperature is still near thermal temperature. The equivalent electrical discharge requires 3 -4 ev to achieve the same degree of ionization. At the energies for the equivalent electrical discharge collisional radiated recombination is inefficient. Thus the collisional rediated recombination DNP laser requires less energy to reach threshold than other DNP lasers and has a higher efficiency than the same electrical laser.

It is believed that other gas mixtures similar to Ne-N$_2$ will give a collisional rediation recombination dominated DNP laser. A typical example would be a mixture of He and CO gases. This is because He metastable states have sufficient energy to dissociate the CO molecule, creating an excited carbon atom in the upper laser level which produces a transition at 1.06 microns in the same manner as herein described for the Ne-N$_2$ mixture.

The embodiments of the invention in which an exclusive property or privilege is claimed are defined as follows:

1. A laser system comprising, a gas laser structure including a laser cavity filled with a gaseous laser active material, said laser active material including a mixture of a majority gas and a minority gas, said mixture being chosen from the group consisting of Ne-N$_2$ where Ne is the majority gas and He-CO where He is the majority gas, and radiation means for providing ionizing radiation to said gaseous laser active material.

2. The system of claim 1 wherein said mixture is of Ne-N$_2$.

3. The system of claim 2 wherein the concentration of N$_2$ in Ne in said mixture is between 0.01 and $\frac{1}{2}$ percent.

4. The system of claim 3 wherein said radiation means includes fissionable material and a neutron source, said fissionable material being responsive to neutrons from said neutron source to generate ionizing radiation which is incident on said laser active material, the neutron flux density from said neutron source developing sufficient ionizing radiation from said fissionable material for said laser active material to reach threshold.

5. The system of claim 4 further including gas-handling means coupled to said laser cavity for maintaining the desired pressure of said gaseous laser active material.

* * * * *